Nov. 2, 1937.   M. P. WHITNEY   2,097,942
BRAKE MECHANISM
Filed Dec. 20, 1929   2 Sheets-Sheet 2
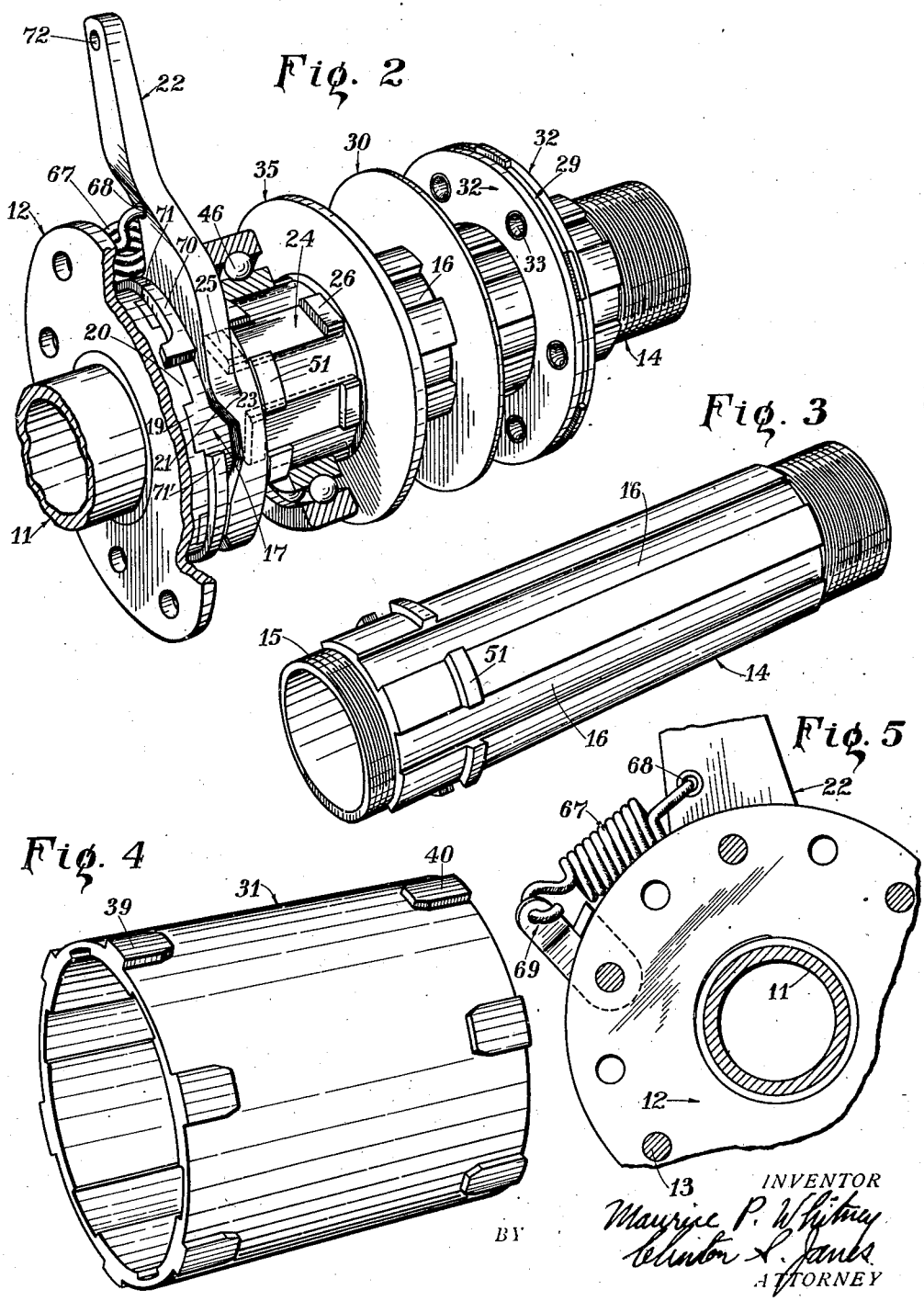

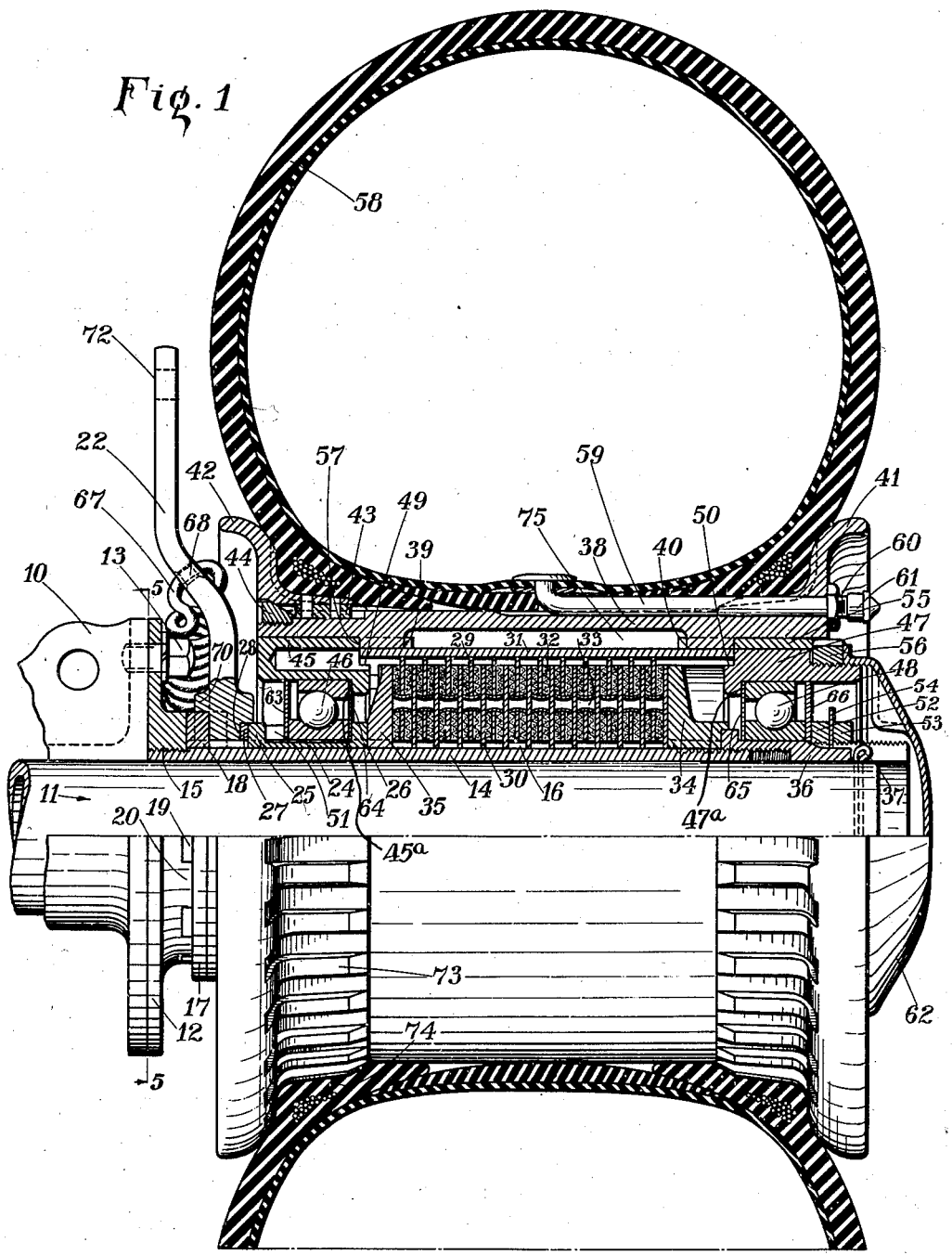

Patented Nov. 2, 1937

2,097,942

UNITED STATES PATENT OFFICE 2,097,942

BRAKE MECHANISM

Maurice P. Whitney, Elmira, N. Y., assignor to Eclipse Machine Company, Elmira, N. Y., a corporation of New York Application December 20, 1929, Serial No. 415,570

15 Claims. (Cl. 188—18)

The present invention relates to brake mechanism, and more particularly to brake mechanism for aeroplane wheels of the so-called "airwheel" type in which the cross-section of the tire is increased to such an extent that the mounting rim is placed directly on the hub and is in effect a part thereof.

In designing brakes for wheels of this character, difficulty has been encountered in securing adequate braking surfaces within the necessarily small permissible diameters, and in disposing of the heat generated through the braking action without incurring injurious effects on the tire, and associated parts. Furthermore it has been found to be difficult to design a brake which is located within the confines of the hub so as not to break the streamline of the wheel.

One object of the present invention is to provide a novel brake of the above character which is strong, light, and of generally improved efficiency.

Another object of the invention is the provision of such a brake mechanism in which the braking surfaces may readily be increased to provide adequate capacity without increasing the diameter of the wheel hub.

Another object of the invention is the provision of such a brake in which the heat generated through the braking action is lead away from those parts which would be injuriously affected thereby, and in which in particular the tire is insulated from those parts which are subject to heating.

A further object of the invention is to provide a novel brake structure for aeroplane wheels the parts of which are arranged within the contour of the hub of the wheel whereby the brake does not interfere with the streamlining of the wheel.

A further object of the present invention is to provide such brake structure in which the tire and the mounting rim therefor may be readily detached from the hub without disturbing the adjustment of the hub bearings or the braking members.

Another object of the invention is to provide such braking mechanism which embodies means for accurate and positive control, and easy and permanent adjustment.

Further objects and advantages will become apparent to those skilled in the art by reference to the following description taken in connection with the accompanying drawings.

In the drawings:

Fig. 1 is a vertical section through a wheel and hub embodying the present invention, certain of the parts being shown in elevation;

Fig. 2 is a perspective of the operating mechanism of the brake with certain parts broken away;

Fig. 3 is a perspective of the mounting and anchoring sleeve for the brake;

Fig. 4 is a perspective of the external brake sleeve; and

Fig. 5 is a vertical section taken substantially on the line 5—5 of Fig. 1.

Referring first to Fig. 1 of the drawings, a bracket 10 is shown forming a part of the usual landing gear and carries a stationary hollow axle member 11. An anchoring plate member 12 is adapted to be rigidly fixed to the bracket 10 by suitable means such as cap screws 13 which are evenly spaced about the contacting flanges of said members in order to provide for rotary adjustability of the mounting plate.

A mounting and anchoring member in the form of a sleeve 14 is slidably mounted upon the axle 11 and threaded at 15 within the mounting plate 12. The sleeve 14 is externally splined throughout the major portion of its length as indicated at 16. A locking ring 17 formed with corresponding integral splines 18 is adapted to be mounted on said sleeve and is provided with lugs 19 which are adapted to interlock with radial lugs 20 on the mounting plate 12 and lock the sleeve 14 from rotation. In the assembly of these elements, the sleeve 14 is of course first threaded within the mounting plate 12 and then locking ring 17 is slid up against the plate 12 to securely lock the sleeve to said plate. The arrangement is such that the combination of the two elements is equivalent to a single piece as regards tension and torsion.

Locking ring 17 is provided with a series of face cams 21 (Fig. 2), and an actuating cam member 22 is freely journaled on the inner end of sleeve 14 and is provided with complementary cam surfaces 23 whereby rotation of the actuating member will cause longitudinal motion thereof to the right (Fig. 2). A series of brake controlling elements in the form of pusher members 24 are mounted to slide longitudinally within the splines 16 of sleeve 14, and are provided with abutments 25 and 26 at the ends thereof extending radially above said splines. Abutments 25 are adapted to rest against a thrust ring 27 (Fig. 1) having a thrust bearing engagement with the actuating cam member 22 at 28. The brake proper in the embodiment here illustrated consists of a series of interleaved disks 29 and 30, disks 30 being splined to the sleeve 14 and disks 29 to a drum or hub member in the form of a rotary external sleeve 31. The disks 29 which are externally splined to the sleeve 31 are provided with friction linings 32 of any suitable material fixed thereto as by means of hollow rivets 33. The brake disks 29 and 30 are confined between a normally fixed abutment ring 34 and a slidable abutment ring 35, both of said rings being splined to the sleeve 14, and the ring 35 being in thrust relation with the abutments 26 of pushers 24. Ring 34 is maintained in position upon sleeve 14 by suitable adjusting means such as a hollow nut member 36 which is internally threaded to engage the end of sleeve 14 and which is castellated at its outer end and retained in adjusted position by means of a cotter pin 37 mounted in an opening through shaft 11.

A demountable rim member 38 is splined upon the sleeve 31 as indicated at 39 and 40, and is provided on one side with an integral flange 41 and on the other side with a detachable flange 42 splined to said rim as indicated at 43 and locked thereon by suitable means such as a wedge ring 44 threaded on said rim.

Rim 38 is supported at one side on a hub member 45 which is mounted on an anti-friction radial and thrust bearing 46 mounted on sleeve 14 in position to encircle the push members 24 and seated against an internal shoulder 45a within the hub member 45. Since the bearing 46 is seated on the tops of the splines 16, the pushers 24 can slide freely between said splines without frictional contact with said bearing. Rim 38 is supported at the other side on a hub member 47 mounted on a similar bearing 48 which is fitted on the cylindrical external surface of the brake adjusting member 36 and is seated against an internal shoulder 47a within the hub member 47. Hub members 45 and 47 are suitably formed with plain circumferential shoulders at their inner faces as indicated at 49 and 50 to receive and support the ends of sleeve 31 and form therewith a complete hub which is held in assembled relation by the bearings 46 and 48.

Bearing 46 is prevented from motion to the left in Fig. 1 by means of lugs 51 formed integrally on sleeve 14 on top of the splines thereof, while bearing 48 is maintained in adjusted position by means such as a pair of lock nuts 52 and 53 threaded on the nut 36 and locked in adjusted position by a lock washer 54.

A spacing ring 55 of a thickness equal to the depth of splines 40 is pressed within the rim member 38 to form a suitable seat on hub member 47. A retaining ring 56 is threaded on the outer end of hub member 47 and bears against the end of spacing ring 55 to retain the same, and consequently the rim 38 fixed upon the hub.

Hub member 45 is formed with a shoulder 57 which acts as a stop for the rim 38 by bearing against the ends of the splines 39 thereof.

The tire 58 which may be of any suitable construction is mounted in the usual way upon the rim 38, the valve 59 of the inner tube thereof being bent at right angles so as to extend through the rim flange 41 as indicated at 60 where it is provided with the usual sealing cap 61.

Hub cap 62 of any suitable design may be threaded on the hub member 47 against the locking ring 56 to enclose the hub and to lock said ring in assembled position. Bearings 46 and 48 are preferably provided with suitable lubricant retaining rings 63, 64, 65, and 66, the rings 63 and 66 being formed of sufficiently heavy metal to act as spacers between the bearings and their abutments 51 and 52 respectively.

A releasing spring 67 (Fig. 5) of any suitable form is attached to the brake actuating member 22 at one end as at 68, and at its other end is attached to mounting plate 12 as by means of bracket 69. The actuating member 22 is provided with a lug 70 (Fig. 2) which is adapted to rest against a co-operating lug 71 to form a stop for the member 22 in its idle position, and also to abut against lug 71' in its forward position to prevent the cam surfaces riding by each other. A suitable operating connection, not illustrated, is adapted to be connected to an eye 72 in the outer end of actuating member 22 to connect the same with manual operating mechanism within the fuselage of any preferred or conventional type.

It will be understood that the mechanism here described is duplicated upon the other end of axle 11, the parts thereof being largely interchangeable. For this purpose, the cam surfaces on the anchoring member 12 and actuating member 22 are formed with double inclinations so as to operate in either direction.

In operation, when the actuating member 22 is swung away from its normal position, the cams thereof cause it to move longitudinally to the right in Fig. 1, thereby exerting pressure upon the pusher members 24 causing the brake disks to be compressed between the rings 35 and 34. The controlled friction so induced exerts a powerful retarding action on the sleeve 31 which action is transmitted through splines 39 and 40 to rim 38 and thus to the tire 58. The tire and rim are preferably provided with interlocking lugs and recesses 73 and 74 respectively in order to prevent the tire from creeping on its rim.

It will be noted that the friction material 32 acts as an insulation for disks 29 which are splined to the sleeve 31 so that most of the heat generated during the braking action is conducted by the disks 30 to the sleeve 14 and is dissipated in the metal parts connected thereto. It will be further noted that an insulating air space 75 is formed between the interior of the rim 38 and the exterior of sleeve 31, whereby the heat which is conducted to the sleeve 31 is effectively retarded from reaching the inner tube of the tire 58 to any injurious degree.

Adjustment of the actuating member 22 to its most effective position is readily obtained by adjusting the anchor member 12 on the bracket 10.

To adjust the tightness of the brake, the cotter pin 37 is removed and nut member 36 rotated to move the abutment ring 34 into the desired position. It will be noted that this adjustment also changes the adjustment of bearings 46 and 48. Independent adjustment of these bearings is provided by the lock nuts 52 and 53.

Removal of the tire and rim without disturbing the hub and brake assembly is readily accomplished by removing hub cap 62 and lock ring 56, whereupon the rim 38 may be readily slid from said hub. To remove the tire 58 from the rim, it is merely necessary to deflate the tire and press the bead away from the removable flange 42, whereupon said flange may be slid inwardly sufficiently to release the wedge ring 44. The ring 44 is then unscrewed from the rim and the flange 42 and the tire can thereupon be removed from the rim. The entire assembly may be dismounted from the axle 11 by removing the cotter pin 37 and cap screws 13 and sliding the assembly off as a unit.

Although but one embodiment of the invention has been shown and described, it is to be understood that this structure is not exclusive and further embodiments will now suggest themselves to those skilled in the art, and certain parts may be combined, altered or omitted and changes made in the arrangement and mode of operation thereof without departing from the spirit of the invention.

Reference will therefore be had to the claims hereto appended for a definition of the scope of the invention.

What is claimed is:

1. In an aeroplane wheel, a hub, a fixed anchor member extending within said hub, cooperating brake members non-rotatably fixed respectively to the hub and anchor member, said anchor member having a grooved portion, a bearing for the hub seated on the grooved portion of said anchor member, controlling means for said brake members extending in said grooves beneath the bearing member and manually operated means for actuating said control means.

2. In an aeroplane wheel, a hub, a fixed anchor member extending within said hub, cooperating brake members non-rotatably fixed respectively to the hub and anchor member, said anchor member having a grooved portion, a bearing for the hub seated on the grooved portion of said anchor member, controlling means for said brake members extending in said grooves beneath the bearing member and a manually operated cam member loosely mounted on said anchor member and adapted to actuate said control means.

3. In an aeroplane wheel, a hub, a fixed anchor member extending within said hub, bearings on said anchor member for the ends of said hub, brake mechanism within said hub adapted to frictionally connect the hub with the anchor member, controlling means for said brake mechanism extending through one of said bearings, and adjusting means for said brake mechanism extending through another of said bearings.

4. In an aeroplane wheel, a hub, a fixed anchor member extending within said hub, bearings on said anchor member for the ends of said hub, cooperating brake disks splined respectively to the hub and anchor member, manually operated controlling means for said brake disks extending freely through one of said bearings, and an adjustable abutment for said brake disks forming a seat for the other bearing.

5. In a motor vehicle, an anchor member adapted to be detachably mounted on an axle of the vehicle, a pair of bearings loosely mounted near the ends of said anchor member, a hub supported by and between said bearings, braking members within said hub connected respectively to said hub and to the anchor member, means on said anchor member preventing movement of said bearings away from said hub whereby the hub, anchor member and brake members are removable as a unit.

6. In a vehicle wheel, a hub having internal shoulders near each end and a pair of bearings seated in the ends of said hub against said shoulders, an axle, an anchoring sleeve, said bearings being slidably mounted on the ends of said anchoring sleeve, thrust means on said anchoring sleeve for confining the bearings thereupon, detachable means for locking said anchoring sleeve to said axle, brake elements anchored respectively to said hub and said anchoring sleeve and controlling means for said brake elements mounted on said anchoring sleeve whereby the hub, brake and controlling means are removable from said axle as a unit with said anchoring sleeve.

7. In a vehicle wheel, a hub having internal shoulders near each end and a pair of bearings seated in the ends of said hub against said shoulders, an axle, an anchoring sleeve, said bearings being slidably mounted on the ends of said anchoring sleeve, thrust means on said anchoring sleeve for confining the bearings thereupon, detachable means for locking said anchoring sleeve to said axle, brake elements anchored respectively to said hub and said anchoring sleeve, controlling means for said brake elements mounted on said anchoring sleeve, and a member for adjusting said brake elements, said member being adjustable while the anchoring sleeve is locked on said axle.

8. In a motor vehicle, an anchor member adapted to be detachably mounted on an axle of the vehicle, a pair of bearings loosely mounted thereon, a hub supported between said bearings, braking members within the hub connected respectively to the hub and anchor member, means on the anchor member for confining the bearings thereon, and a tire receiving rim splined on said hub.

9. In a motor vehicle, an anchor member adapted to be detachably mounted on an axle of the vehicle, a pair of bearings loosely mounted thereon, a hub supported between said bearings, braking members within the hub connected respectively to the hub and anchor member, means on the anchor member for confining the bearings thereon, a tire receiving rim splined on said hub, and means for resisting the transmission of heat from said braking members to the rim.

10. In a motor vehicle, an axle, an anchor member adapted to be detachably mounted thereon, a pair of bearings loosely mounted on the anchor member, a hub supported by and between said bearings, braking members within the hub connected respectively to the hub and anchor member, means on the anchor member for confining the bearings thereon, means on the anchor member for controlling the actuation of the braking members, and means for confining said controlling means on the anchor member whereby the hub, braking members and controlling means are removable with the anchor member as a unit.

11. In a brake, a stationary cylinder having an outer end portion formed with screw threads, an abutment ring secured on said screw threads for adjustment longitudinally of said cylinder, a non-rotatable crowding ring encircling said cylinder in spaced relation to said abutment ring movable longitudinally of said cylinder, and an assembly of rotatable and non-rotatable friction rings interposed between said crowding and abutment rings.

12. In a brake, a stationary cylinder having an outer end portion formed with screw threads, an abutment ring secured on said screw threads for adjustment longitudinally of said cylinder, a non-rotatable crowding ring encircling said cylinder in spaced relation to said abutment ring movable longitudinally of said cylinder, an assembly of rotatable and non-rotatable friction rings interposed between said crowding and abutment rings, and means for releasably holding said abutment ring against turning on said screw threads.

13. In a brake, a stationary cylinder, spaced rings splined on said cylinder for movement longitudinally of the latter relative to each other, a rotatable friction ring interposed between said spaced rings and revoluble relatively thereto, an abutment ring screwed on said cylinder for adjustment longitudinally thereof serving as an adjustable abutment at one end of the ring assembly, and non-rotatable means at the other end of said ring assembly for advancing said rings into frictional engagement with each other.

14. In a brake, a stationary cylinder, spaced rings splined on said cylinder for movement longitudinally of the latter relative to each other, a friction ring interposed between said spaced rings and revoluble relatively thereto, an abutment ring screwed on said cylinder for adjustment longitudinally thereof serving as an adjustable abutment at one end of the ring assembly, non-rotatable means at the other end of said ring assembly for advancing said rings into frictional engagement with each other, and means for holding said abutment ring against accidental turning on said cylinder.

15. In a brake, a stationary cylinder having an outer end portion formed with screw threads, an abutment ring secured on said screw threads for adjustment longitudinally of said cylinder, a non-rotatable crowding ring encircling said cylinder movable longitudinally of said cylinder and independent of said abutment ring, and an assembly of rotatable and non-rotatable friction rings mounted on said cylinder, said crowding ring being adapted to press axially upon said friction rings and said abutment ring for frictional engagement of said friction rings.

MAURICE P. WHITNEY.